4 Sheets--Sheet 1.

J. HATFIELD.
Paper-Bag Machine.

No. 165,823.  Patented July 20, 1875.

Witnesses;
N. B. Smith
F. B. Townsend

Inventor;
James Hatfield
By his atty
R. W. O. Smith

4 Sheets--Sheet 2.

J. HATFIELD.
Paper-Bag Machine.

No. 165,823.

Patented July 20, 1875.

Attest.
N. B. Smith
J. B. Townsend

Inventor.
James Hatfield
By his atty
R. D. O. Smith

J. HATFIELD.
Paper-Bag Machine.
No. 165,823.
4 Sheets--Sheet 3.
Patented July 20, 1875.
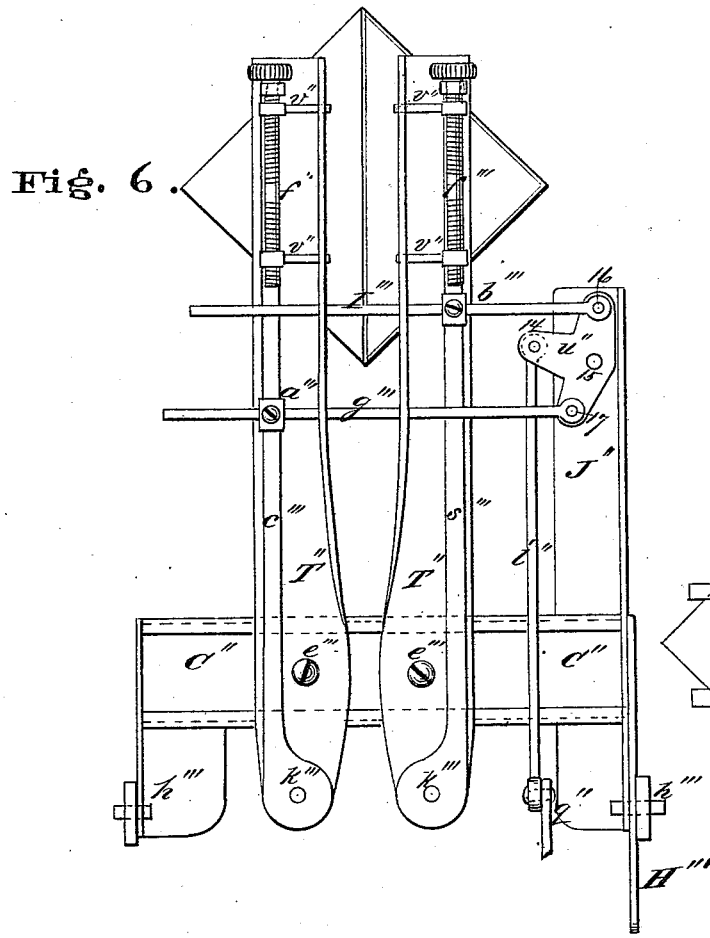
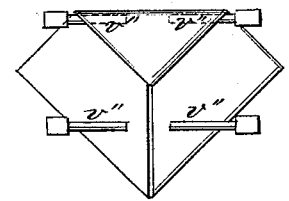
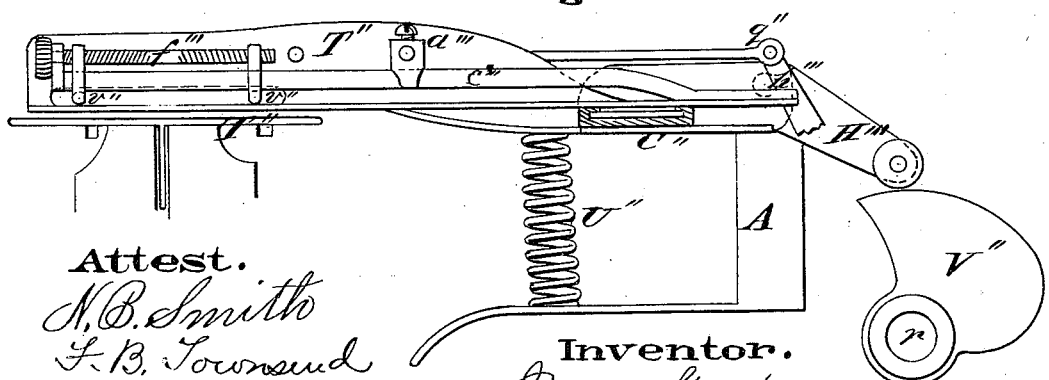
Attest.
N. B. Smith
F. B. Townsend
Inventor.
James Hatfield
By his Atty
R. D. O. Smith J. HATFIELD.
Paper-Bag Machine.

No. 165,823.

Patented July 20, 1875.

WITNESSES
N. B. Smith
F. B. Townsend

INVENTOR.
James Hatfield
By his atty
R. D. O. Smith

UNITED STATES PATENT OFFICE.

JAMES HATFIELD, OF CINCINNATI, OHIO.

IMPROVEMENT IN PAPER-BAG MACHINES.

Specification forming part of Letters Patent No. 165,823, dated July 20, 1875; application filed August 25, 1874.

CASE B.

*To all whom it may concern:*

Be it known that I, JAMES HATFIELD, of Cincinnati, in the county of Hamilton and State of Ohio, have invented a new and useful Improvement in Paper-Bag Machines; and I do hereby declare the following to be a full, clear, and exact description of the same, reference being had to the accompanying drawings, in which—

Figure 1:
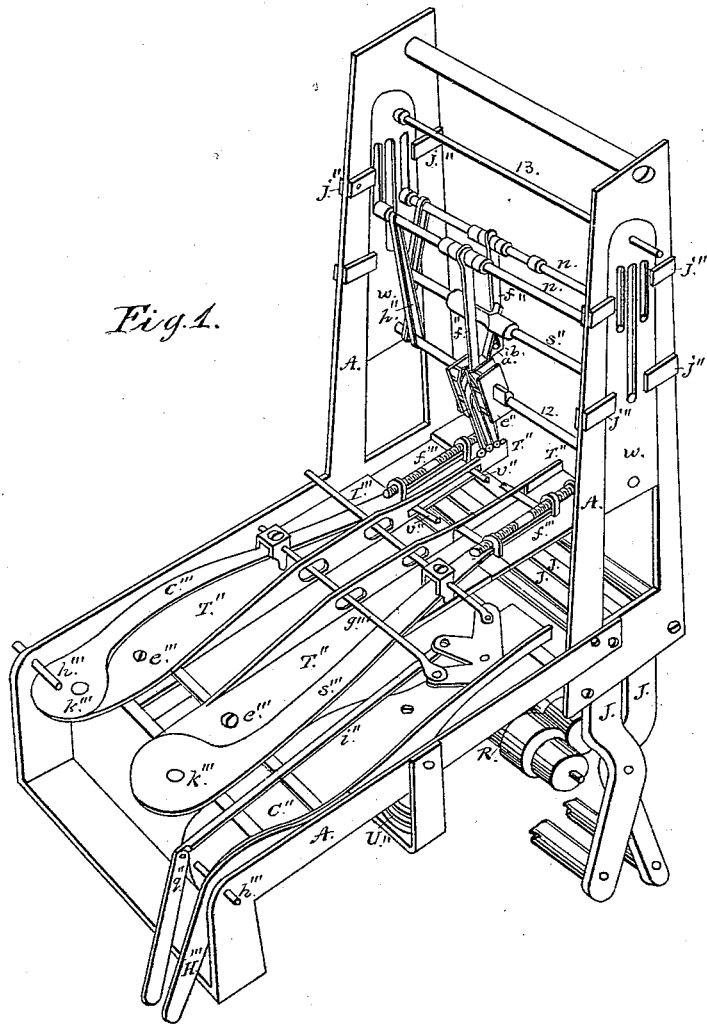
Figure 2:
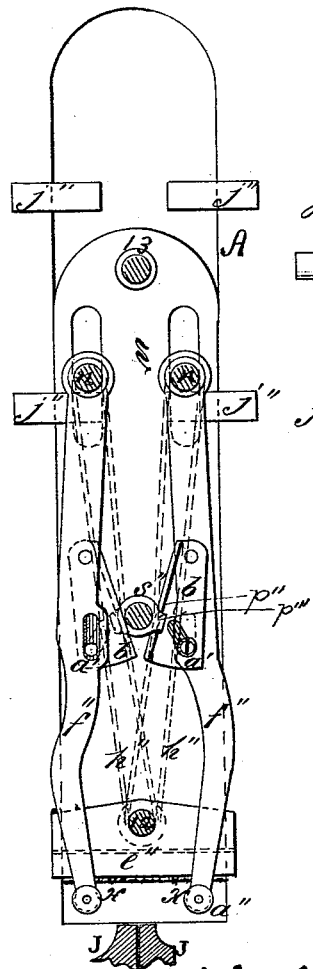
Figure 3:
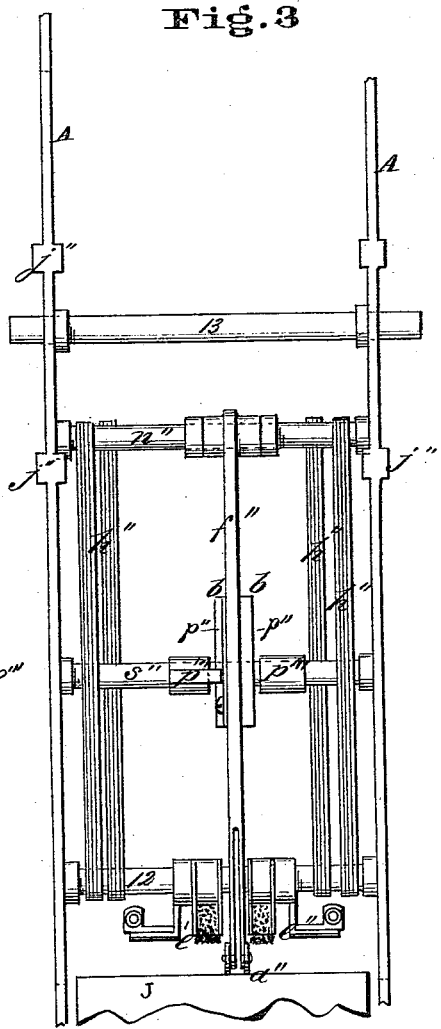
Figure 5:
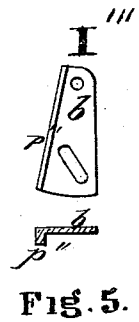
Figure 4:
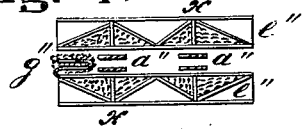
Figure 9:
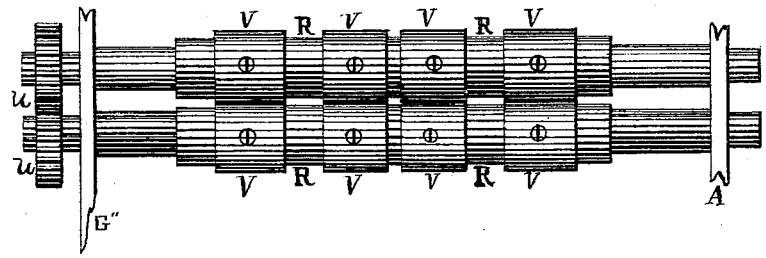
Figure 10:
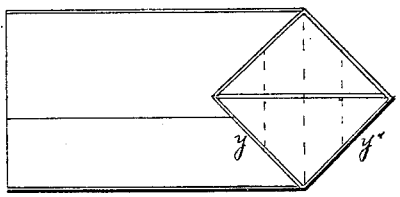

Figure 1 is a perspective view of so much of my machine as is included in this case. Fig. 2 is a longitudinal section of the apparatus for spreading and pasting the fold which forms the bottom of the bag. Fig. 3 is a front elevation of the same. Fig. 4 represents the pasting-pads. Fig. 5 represents the adjusting-plates for the spreader-arms. Fig. 6 is a plan of the fold-holders. Fig. 7 is a longitudinal section of the same. Fig. 8 represents the operation of the fold-guides or fingers. Fig. 9 is a plan of the feed-rollers. Figs. 10, 11, 12, and 13 represent the folding of the bottom in its different stages.

This invention relates to machinery for making paper bags, and particularly to that class of paper-bag machines which produce what is known as the satchel-bottom bag; and it consists in an improved mechanism for producing the peculiar folds of said bottom, and more particularly adapted for use with my paper-bag machine; and it consists, first, in device for spreading the open end of the tube; second, in holders for holding the paper while the folds are being formed.

This present improvement is adapted to the folding of very thick and refractory paper, such as is employed for flour-sacks, &c.

For a particular description of a machine for making the tubes, feeding, holding, pasting, cutting, and delivering the finished bag, reference is hereby made to my application above referred to, though I do not wish to confine myself to the mechanism therein described, because other and different devices may be employed in place thereof, without changing, in any degree, the operation of the devices herein shown and claimed.

That others may fully understand my improvement, I will particularly describe it.

A represents the general frame of the machine, of which only so much is shown in the drawings hereto attached as is necessary for the support of the devices entering into this improvement. J J are jaws, between which the paper blank is fed, and by which the same is held while being folded and pasted by the devices hereinafter to be described. R R are the feed-rollers by which the blank is fed to the folders, and cutter by which the tube is successively severed as the folding is completed and separate bags thereby formed. The feed-rollers R R feed the tube up between the jaws J J, so that the end of said tube projects beyond said jaws a proper distance, and the sides of the tube are slightly separated, by the device described in my said application, or by some other, when the said jaws close and hold the blank firmly griped, ready for the devices which produce the folds and apply the paste, and which I will now particularly describe.

The jaws and feed-rollers referred to above are for convenience of description only, like those described in my application above named.

$w$ is a sliding gate actuated by a cam. This gate carries two shafts, $n\ n$, and these shafts respectively carry the arms $f''\ f''$, the lower ends of which may be armed with small friction-rollers. The arms are pendent from the shafts $n\ n$, and are held in proper relative position by means of plates $b\ b$, which are pivoted to the arms $f''\ f''$, respectively, and adjustable thereon, so as to vary the obliquity of the edge of said plate to the axis of the arm. The oblique edges of the plates $b$ are provided with flanges $p''$, and said flanges engage with hooks projecting from collars $p'''$ upon the shaft $S''$. When the gate $w$ is at the top of its slide, or in position of rest, the shafts $n\ n$ are at the bottom of the slots, and the lower ends of the arms $f''\ f''$ are close together. From this position, at the proper moment, the gate is caused to descend, and the end of the arms $f''\ f''$ enter the open end of the tube and come in contact with the jaws J. The further descent of the gate causes the shafts $S''$ to ascend and push the plates $b\ b$ and the arms to which they are attached asunder, as shown in Fig. 2, with the effect of spreading the open end of the bag in the manner shown in Fig. 10. A simultaneous cam movement depresses the holders T", to flatten down the open end of the tube and hold it while the paste is being applied by the pasters $e''$ $e''$, in the manner described in my before-mentioned application. After such application of the paste the further revolution of its driving-cam permits the gate $w$ to rise again to its place. Each plate $b$ is constructed with an oblique slot, and the arm $f''$ is provided with a similar slot of opposite obliquity, and a screw-bolt passes through these slots and binds the two together, while a shifting of said bolt in said slot will immediately effect a change of the adjustment of plate B. The effect of this adjustment is to give a wider movement to the arms $f''$ and enable them to be adapted to bags of various sizes.

The pasters $e''$ $e''$ are faced with proper pads to take up the paste and deliver it upon the fold of the bag. The paste may be contained in a proper receptacle, and fed by a roller, over which the pasters will pass, as shown in my application above referred to, or by any other proper mechanism.

Figure 11:
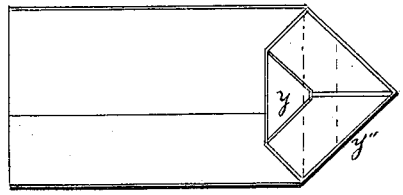
Figure 12:
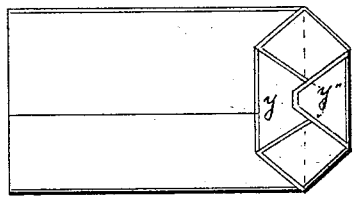
Figure 13:
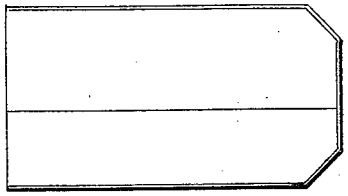

Simultaneously with the latter part of the movement of the devices just described, the holders T" T" are depressed by their proper cam. These holders are mounted upon a frame, J", which is pivoted, by pins $h'''$, to the frame A at one end, and their free ends are located immediately above the jaws J J, and at either side of the pasters $e''$ $e''$. They are depressed by a cam, V", upon the main cam-shaft acting against the arm H''', which is a continuation of the frame J", and when released from said cam they are raised by the string U". The frame J" has a cross-bar, $c''$, upon which the holders T" are laterally adjustable, and this adjustability I prefer to arrange by sliding pieces, to which the holders are secured by pins $e'''$. This lateral adjustment of the holders is for the purpose of adapting them to the proper folding of bags of different sizes. The spreaders $f''$ open the end of the paper tube, and the holders flatten the open end in the form shown in Fig. 10, and hold the lateral corners thereof while the proper mechanism is folding successively the corners $y$ and $y''$, as shown in Figs. 11 and 12. With stiff paper—such as is employed in manufacturing flour-sacks, &c.—it is necessary to interpose a rigid object to mark the place for the fold of the flaps $y$ and $y''$, or the stiff and elastic paper is liable to spring up and produce false folds. Simply creasing the paper in the line of the fold is not sufficient when the same is very stiff and elastic, and I therefore interpose the rods or fingers $v''$ in the lines of the front and rear folds, and over these rods the flaps $y$ and $y''$ are folded, and said rods are withdrawn before the flaps are pressed down. This produces a positive folding device, which does not admit the formation of false folds or any deviation in the position of the folds, so that perfect uniformity is secured.

The fingers $v''$ I mount upon long arms $c'''$ and $s'''$, and these arms are pivoted to the ends of the holders T" by pins $k''$, so that the arms $c'''$ and $s'''$ may have an oscillation in lateral direction, advancing or retracting said fingers $v''$ to bring them into position over the fold, as shown in Fig. 8, or withdrawing them when the same is made. This oscillation I produce by means of a bell-crank, $w''$, and two connecting-rods, I''' and $g'''$, which actuate the arms $c'''$ and $s'''$, respectively. The bell-crank $w''$ is pivoted to the frame J" by the pin 15, and the connecting-rods I''' and $g'''$ are, respectively, pivoted to said bell-crank by the pins 16 and 17. The whole is operated by a cam-rod, $i''$, pivoted to the bell-crank $w''$ by the pin 14, provided with an arm pivoted thereto at $q''$ and actuated by a cam upon the main cam-shaft. (Not shown in the drawing.)

Lateral adjustment of the arms $c'''$ and 3, to correspond with the lateral adjustment of the holders T", is attained by means of the slip and set-screw connections $a'''$ and $b'''$, and the necessary longitudinal adjustment of the fingers $v''$ is secured by the right and left hand adjusting-screws $f'''$, which are mounted in studs upon the arms $c'''$ and $s'''$, respectively, so that the holders T" and fingers $v''$ are adjustable, to adapt them to the folding of bags of such various sizes as may be required.

A small supplemental paster, $g''$, is attached to the pasters $e''$, and extended into the space between said pasters at one end thereof, for the purpose of delivering paste upon the point of the flap $y''$. This is made necessary because the spreaders $f''$ $f''$ are located between said pasters $e''$, and prevent them from delivering paste upon the points of either flap $y$ or $y''$.

Having described my invention, what I claim as new is—

1. Two swinging levers, $f''$ $f''$, combined with suitable operative mechanism to cause said levers to descend into and separate the end of the tube, substantially in the manner set forth.

2. The spreading-levers $f''$ $f''$, provided with adjusting-plates $b$, friction-rollers $a''$, lugs $j''$, combined and operating substantially as and for the purpose set forth.

3. The reciprocating fingers $v''$ $v''$, arranged in pairs to approach each other from opposite sides without meeting, so as to leave uncovered the center line of the bag-bottom, and permit the central surface of the triangular side folds, and of the bottom, to be pasted together before the fingers are retracted, substantially as described.

4. The holders T" T", adjustably mounted upon the vibrating frame J", and combined with suitable spreading, pasting, and folding mechanism, for the purpose set forth.

5. Combined with the holders T" T", the arms $c'''$ $s'''$, pivoted to said holders, and provided with the fingers $v''$ $v''$, and suitable mechanism, to transmit motion from their cam to said fingers, substantially as set forth.

6. Combined with the oscillating arms $c'''$ $s'''$, provided with the fingers $v''$ $v''$ and adjusting-screws $f'''$ $f'''$, the rods $l'''$ and $g'''$, with adjustable couplings $a'''$ $b'''$, bell-crank $u''$, and cam-rod $i''$, substantially as set forth.

JAMES HATFIELD.

Witnesses:
R. D. O. SMITH,
N. B. SMITH.